(12) United States Patent
Lacoss-Arnold et al.

(10) Patent No.: US 11,803,851 B2
(45) Date of Patent: Oct. 31, 2023

(54) SYSTEMS AND METHODS FOR IDENTIFYING PAYMENT ACCOUNTS TO SEGMENTS

(71) Applicant: MASTERCARD INTERNATIONAL INCORPORATED, Purchase, NY (US)

(72) Inventors: Jason Jay Lacoss-Arnold, St. Louis, MO (US); Jason M. Mueller, O'Fallon, MO (US); Jeffrey L. Altemueller, Marthasville, MO (US); Krista Tedder, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 17/077,895

(22) Filed: Oct. 22, 2020

(65) Prior Publication Data

US 2021/0042751 A1 Feb. 11, 2021

Related U.S. Application Data

(63) Continuation of application No. 14/918,956, filed on Oct. 21, 2015, now abandoned.

(51) Int. Cl.
*G06Q 20/40* (2012.01)
*G06Q 20/32* (2012.01)

(52) U.S. Cl.
CPC ..... *G06Q 20/4015* (2020.05); *G06Q 20/3224* (2013.01); *G06Q 20/405* (2013.01); *G06Q 20/4016* (2013.01)

(58) Field of Classification Search
CPC .... G06Q 40/00; G06Q 40/02; G06Q 20/4015; G06Q 20/40; G06Q 20/32

(Continued)

(56) References Cited

U.S. PATENT DOCUMENTS

| 5,659,724 A | 8/1997 | Borgida et al. |
| 6,061,665 A | 5/2000 | Bahreman |

(Continued)

FOREIGN PATENT DOCUMENTS

| CN | 102667837 A | 9/2012 |
| CN | 103745345 A | 4/2014 |

(Continued)

OTHER PUBLICATIONS

Anonymous "The mobile payments and NFC landscape: A US perspective." Smart card Alliance (2011): 1-53. (Year: 2011).*

(Continued)

*Primary Examiner* — Kelly S. Campen
(74) *Attorney, Agent, or Firm* — Harness, Dickey & Pierce, P.L.C.

(57) ABSTRACT

Systems and methods for use in identifying payment accounts to segments are provided. One exemplary method includes receiving a first indicator for a first location from a communication device, where the communication device is associated with a consumer and the consumer is associated with a payment account issued to the consumer by an issuer. The method also includes appending, by a computing device, the payment account to a first segment based on the first location indicator, and causing at least one rule associated with the payment account to be modified where the at least one rule relates to authorization of transactions in a first region including the first location.

7 Claims, 3 Drawing Sheets

(58) Field of Classification Search
USPC .......... 705/30, 35, 38, 39, 40; 235/379, 380
See application file for complete search history.

(56) References Cited

U.S. PATENT DOCUMENTS

| | | |
|---|---|---|
| 6,418,415 B1 | 7/2002 | Walker et al. |
| 7,020,622 B1 | 3/2006 | Messer |
| 7,216,100 B2 | 5/2007 | Elliott |
| 7,248,855 B2 | 7/2007 | Joyce et al. |
| 7,483,856 B2 | 1/2009 | Likourezos et al. |
| 7,527,195 B2 | 5/2009 | Keithley et al. |
| 7,653,598 B1 | 1/2010 | Hamilton et al. |
| 7,657,626 B1 | 2/2010 | Zwicky |
| 7,698,182 B2 | 4/2010 | Falcone et al. |
| 7,716,113 B2 | 5/2010 | Crosthwaite et al. |
| 8,103,543 B1 | 1/2012 | Zwicky |
| 8,510,135 B1 | 9/2013 | Gorog et al. |
| 8,544,089 B2 | 9/2013 | Jakobsson et al. |
| 8,606,662 B2 | 12/2013 | Tomchek et al. |
| 8,682,718 B2 | 3/2014 | Zwicky |
| 8,931,703 B1 | 1/2015 | Mullen et al. |
| 9,152,977 B2 | 10/2015 | Zwicky |
| 2002/0194096 A1 | 12/2002 | Falcone et al. |
| 2003/0046105 A1 | 3/2003 | Elliott |
| 2003/0061064 A1 | 3/2003 | Elliott |
| 2006/0004626 A1 | 1/2006 | Holmen et al. |
| 2006/0226216 A1 | 10/2006 | Keithley et al. |
| 2008/0162475 A1 | 7/2008 | Meggs |
| 2009/0254462 A1 | 10/2009 | Tomchek et al. |
| 2011/0041178 A1 | 2/2011 | Jakobsson et al. |
| 2011/0087495 A1 | 4/2011 | O'Neill et al. |
| 2011/0218871 A1 | 9/2011 | Singh |
| 2011/0302061 A1 | 12/2011 | Olives et al. |
| 2011/0314557 A1 | 12/2011 | Marshall |
| 2012/0084146 A1 | 4/2012 | Zwicky |
| 2012/0096490 A1 | 4/2012 | Barnes, Jr. |
| 2013/0191167 A1 | 7/2013 | Gorog et al. |
| 2014/0101765 A1 | 4/2014 | Jakobsson et al. |
| 2014/0122343 A1 | 5/2014 | Einav et al. |
| 2014/0149208 A1 | 5/2014 | Zwicky |
| 2015/0149356 A1* | 5/2015 | Feldman ............ G06Q 20/4016 705/44 |
| 2015/0161586 A1* | 6/2015 | Bailey .................. G06Q 20/405 705/44 |
| 2015/0227934 A1* | 8/2015 | Chauhan ............ G06Q 20/3224 705/44 |
| 2015/0229623 A1* | 8/2015 | Grigg .................... H04W 12/64 726/7 |
| 2015/0269380 A1 | 9/2015 | Golovanov et al. |
| 2015/0294304 A1* | 10/2015 | Donnellan ......... G06Q 20/3278 705/44 |
| 2016/0224964 A1* | 8/2016 | Vergari .................. G06Q 40/02 |
| 2016/0226905 A1 | 8/2016 | Baikalov et al. |
| 2016/0247174 A1* | 8/2016 | Carrington ......... G06Q 30/0204 |
| 2017/0011078 A1* | 1/2017 | Gerrard .................... G06F 16/22 |
| 2017/0116584 A1 | 4/2017 | Lacoss-Arnold |
| 2017/0116604 A1 | 4/2017 | Lacoss-Arnold |

FOREIGN PATENT DOCUMENTS

| | | |
|---|---|---|
| CN | 103745397 A | 4/2014 |
| CN | 104303198 A | 1/2015 |
| CN | 104679777 A | 6/2015 |
| CN | 105264558 A | 1/2016 |

OTHER PUBLICATIONS

Ma, et al. "Location-aware and safer cards: enhancing RFID security and privacy via location sensing." IEEE transactions on dependable and secure computing 10.2 (2012): 57-69. (Year: 2012).*

Marforio et al. "Smartphones as Practical and Secure Location Verification Tokens for Payments." NDSS. vol. 14. 2014. (Year: 2014).*

FICO® Falcon® Fraud Manager; www.fico.com/en/products/fico-falcon-fraud-manager; document accessed Aug. 18, 2015; 11 pgs.

Kyoungsoo Park et al: "Securing Web Service by Automatic Robot Detection", USENIX, May 31, 2006, pages 1-6, XP061009324.

U.S. Appl. No. 14/918,956, filed Oct. 21, 2015, Lacoss-Arnold et al.
U.S. Appl. No. 14/918,956, filed Oct. 21, 2017, Lacoss-Arnold et al.
U.S. Appl. No. 14/918,981, filed Oct. 21, 2017, Lacoss-Arnold et al.

* cited by examiner

SYSTEMS AND METHODS FOR IDENTIFYING PAYMENT ACCOUNTS TO SEGMENTS

CROSS-REFERENCE TO RELATED APPLICATION

This application is a continuation of U.S. patent application Ser. No. 14/918,956 filed on Oct. 21, 2015. The entire disclosure of the above application is incorporated herein by reference.

FIELD

The present disclosure generally relates to systems and methods for use in identifying payment accounts to segments, for example, based on locations of consumers associated with the payment accounts, etc., and causing, as necessary, usage rules for the payment accounts to be modified based on such identification.

BACKGROUND

This section provides background information related to the present disclosure which is not necessarily prior art.

Merchants often offer products such as goods and services for sale to consumers. The products may be purchased through a variety of different means, including, for example, through payment accounts, etc. The payment accounts are known to be issued to the consumers by banks or other financial institutions, called issuers. Occasionally, the payment accounts are used by persons not associated with the payment accounts to make unauthorized purchases. Issuers provide a variety of controls for payment accounts to help limit or minimize the risks associated with such unauthorized use of the payment accounts. For example, fraud protection rules are often applied to payment accounts to limit cumulative amounts of purchases to the payment accounts over given periods, or to require particular user authentications such as signatures, PINs, or biometrics, etc.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Consumers use payment accounts to fund purchases of products such as goods and services. Typically, the purchases are made using payment devices associated with the payment accounts. The payment accounts are often associated with one or more rules, which impact the use of the payment devices, depending on particular factors related to the product purchases. For example, fraud rules may restrict the number of offline transactions that can be completed with payment devices of certain types. The rules can be set based, at least in part, on locations of the consumers (i.e., the consumers' home addresses), numbers of purchases made by the consumers to their respective payment accounts, amounts of purchases made by the consumers to their respective payment accounts, types of purchases made by consumers, etc. The systems and methods herein enable various aspects of consumers and/or their transactions (e.g., current locations of consumers, purchasing status of consumers, etc.) to be identified, and then append the consumers, and in particular their payment accounts, to certain segments based on the identification (e.g., based on the consumers' current locations, based on the consumer's purchasing status, etc.). Then, based on the segments associated with the payment accounts, one or more rules related to use of the payment accounts to complete future purchase transactions may be modified. When the identified aspects relate to current locations of the consumers, for example, the rules associated with their payment accounts may be modified so that the payment accounts can be used in regions other than the consumer's home region, based on their current locations (without raising flags suggesting fraudulent uses of the payment accounts).

Figure 1:
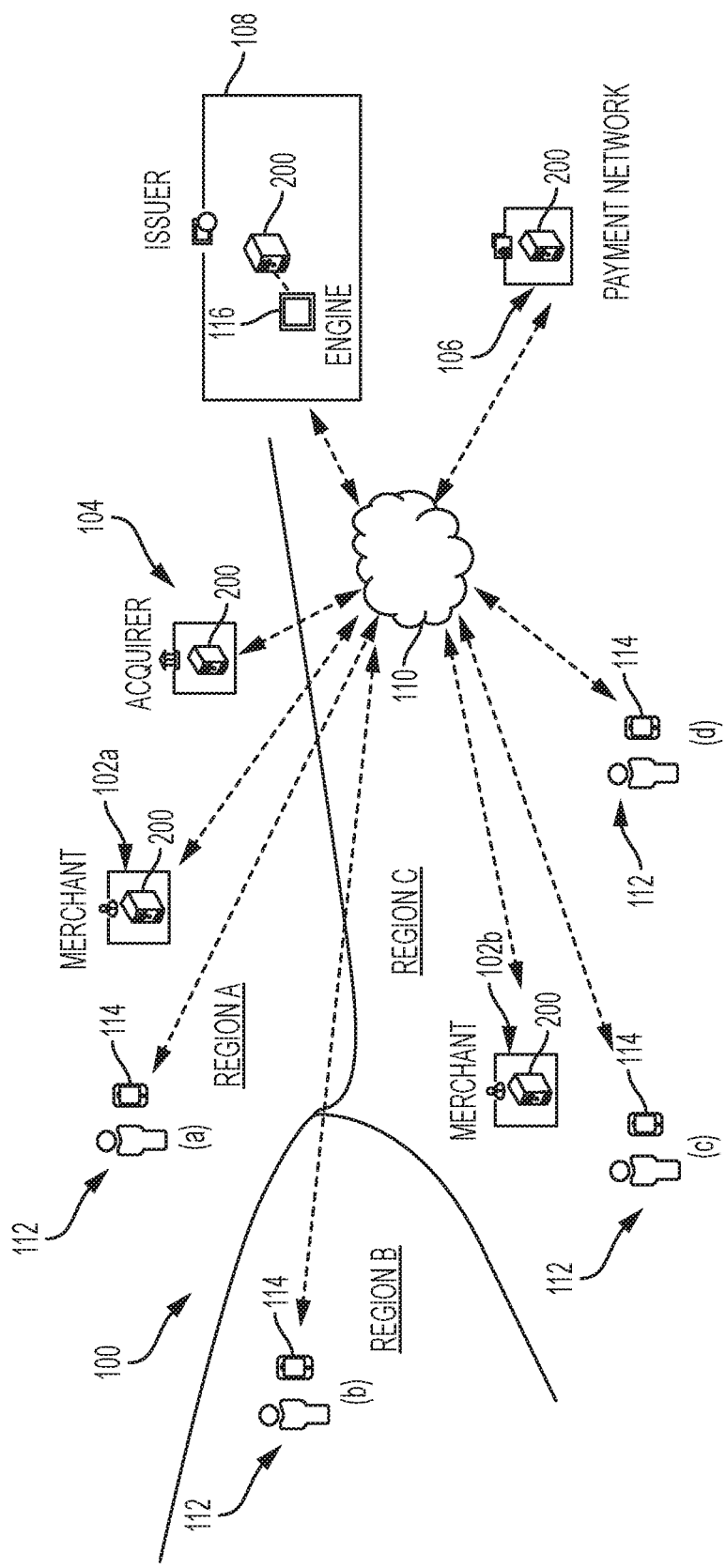
FIG. 1 is a block diagram of an exemplary system of the present disclosure suitable for use in identifying payment accounts to segments, and including one or more aspects of the present disclosure.

FIG. 1 illustrates an exemplary system 100 in which one or more aspects of the present disclosure may be implemented. Although parts of the system 100 are presented in one arrangement, it should be appreciated that other exemplary embodiments may include the same or different parts arranged otherwise, for example, depending on processing of payment transactions, communication between consumers and merchants, etc.

As shown in FIG. 1, the illustrated system 100 generally includes merchants 102*a-b*, an acquirer 104, a payment network 106, and an issuer 108, each coupled to (and in communication with) network 110 (indicated by dashed arrows). The network 110 may include, without limitation, a wired and/or wireless network, a local area network (LAN), a wide area network (WAN) (e.g., the Internet, etc.), a mobile network, and/or another suitable public and/or private network capable of supporting communication among two or more of the illustrated parts of the system 100, or any combination thereof. In one example, the network 110 includes multiple networks, where different ones of the multiple networks are accessible to different ones of the illustrated parts in FIG. 1. In this example, the acquirer 104, the payment network 106, and the issuer 108 may be connected via a private payment network that is part of network 110 for processing payment transactions, and the merchants 102*a-b* and consumer 112 may be connected through a public network, such as the Internet, that is also part of network 110.

The illustrated system 100 is distributed over three different regions: region A, region B and region C. However, such a distribution is not required in all embodiments of the present disclosure. In addition in the system 100, the consumer 112 is illustrated in four different locations in the system 100, at four different times, i.e., at times (a)-(d), thereby representing the movement of the consumer 112 within and between the different regions A-C over time.

Specifically in the system 100, at time (a) the consumer 112 is located in region A; at time (b) the consumer 112 is located in region B, at time (c) the consumer 112 is located in region C near merchant 102*b*; and at time (d) the consumer 112 is still located in region C, but apart from merchant 102*b*.

The consumer 112 is associated with a payment account (and corresponding payment device) issued by the issuer 108 and registered to the payment network 106, for example, to utilize, through the issuer 108, one or more services available from the payment network 106. The services available from the payment network 106 to the consumer 112 may include any suitable services such as, for example, fraud protection services, bill payment services, electronic wallet services (e.g., PayPass® from MasterCard, Apple Pay® from Apple, PayWave® from Visa, etc.) to facilitate or permit purchase transactions to the consumer's payment account, etc.

The consumer 112 is also associated with a communication device 114, which is coupled to the network 110. As shown in FIG. 1, the communication device 114 is associated with the consumer 112 at each of the different times (a)-(d) in the system 100. The communication device 114, often a portable communication device such as smartphone or tablet, is voluntarily identified by consumer 112 (e.g., upon a prompted request, etc.), for example, in connection with the registration of the consumer 112 to the payment account issued to the consumer 112 by the issuer 108. In this manner, the communication device 114 may enable, for the consumer 112, the various services provided by, or through, the payment network 106.

Regardless of what services are provided to the consumer 112 by the payment network 106, the communication device 114, as part of another service, or as part of a standalone service, is also configured to generate a location indicator (reflecting a current location of the communication device 114) and to transmit the indicator to the payment network 106, as desired. The location indicator may include, for example, a street address, a postal code, a country code, a longitude/latitude, or other information indicative of the current (or past) location of the communication device 114 at a particular granularity, if or as desired. In some embodiments, for example, a precise location may be preferred while, in other embodiments, a more general location may be acceptable (e.g., postal code, etc.). It should be appreciated that the location indicator may be used other than described herein, and that such other service(s) may determine the granularity of the location indicator. Conversely, the communication device 114, itself, may be limited in the type and/or precision of location indictors it is able to generate and/or transmit.

The communication device 114 may transmit the location indicator at one or more regular or irregular intervals, or in response to an event such as, for example, movement of the communication device 114 greater than a predefined distance, power cycle of the communication device 114, entry of the communication device 114 into or exit of the communication device 114 from (or other modification of) one or more modes (e.g., airplane mode, etc.), etc. Any predefined distance, when used herein, may be based on a home location of the payment account associated with the communication device 114 (e.g., the address associated with the payment account such as the home address of the consumer, etc.). In general, events and/or intervals used in transmitting the location indicator by the communication device 114 may include any event and/or interval at least suitable to identify or generally represent movement of the communication device 114, and the consumer 112, between different ones of the regions A-C or within the regions A-C of the system 100, whether immediately (in real time), or within a certain period of time.

While only one consumer 112 (in different locations at different times (a)-(d)) and only three regions A-C are illustrated in FIG. 1, is should be appreciated that any number of consumers and/or regions may be included, or utilized, in other embodiments. Likewise, a different number of merchants, acquirers, payment networks, and/or issuer may be included in other system embodiments.

Generally in the system 100, the merchants 102*a-b*, the acquirer 104, the payment network 106, and the issuer 108 cooperate, in response to the consumer 112 (e.g., a purchase by the consumer 112, etc.), to complete a purchase transaction. In the exemplary embodiment, the consumer 112 initiates the transaction by presenting a payment device, such as a credit card, a debit card, a pre-paid card, a payment token, a payment tag, a pass, another device such as communication device 114 that can be used to provide an account number (e.g., a mobile phone, a tablet, etc.), etc., to the merchant 102*a*, for example, in the following description.

In the purchase transaction by the consumer 112, for example, the merchant 102*a* reads the payment device (associated with the payment account issued to the consumer 112 by the issuer 108) and communicates a payment instrument identifier (e.g., an account number, etc.) and an amount of the purchase to the acquirer 104 associated with the merchant 102*a*, through the network 110, to determine if the payment account is in good standing and if there is sufficient credit/funds to complete the transaction. The acquirer 104, in turn, communicates with the issuer 108, through the payment network 106, via the network 110, for authorization for the transaction. If the issuer 108 accepts the transaction, an authorization is provided back to the merchant 102*a* and the merchant 102*a* completes the transaction. The credit line or funds of the consumer 112, depending on the type of payment account, is then decreased by the amount of the purchase, and the charge is posted to the payment account associated with the payment device. The transaction is later cleared and settled by and between the merchant 102*a* and the acquirer 104 (in accordance with a settlement arrangement, etc.), and by and between the acquirer 104 and the issuer 108 (in accordance with another settlement arrangement, etc.).

In connection with accepting the purchase transaction from the acquirer 104, the issuer 108 may employ a variety of rules related to the consumer's payment account, as provided by the payment network 106, for example, to determine whether to authorize or decline the transaction. For example, the issuer 108 may require the purchase to originate from a certain geographic region (e.g., associated with the consumers' home address, etc.), or the issuer 108 may limit the consumer 112 to a particular number of transactions within a specified interval, to a maximum purchase amount, to a particular number of permitted off-line EMV purchases between on-line purchases, etc. In addition, the issuer 108 may set a ceiling of total spend allowed offline for the payment device associated with the consumer's payment account before the payment device must come online, or the issuer 108 may set a limit on a number of offline transactions allowed before the payment device must come online. Further, the issuer 108 may require a point-of-sale terminal being used in a transaction to be within a predefined distance of a last known location for the consumer's communication device 114 (where the predefined distance may vary depending on how recent location data is for the communication device 114 (e.g., the predefined distance may be greater for older last-known location data, etc.). Moreover, when the consumer's payment device includes an offline chip card, it may contain a currency conversion table for use in determining a total spend allowed offline, when the merchant currency is of a different type than the consumer's payment account currency. A location of the consumer 112, based on location data for the consumer's communication device 114, for example, may then be used to trigger an update of the currency table when the consumer 112 enters a new currency region, etc.

Transaction data is generated, collected, and stored as part of the above interactions among the merchant 102a, the acquirer 104, the payment network 106, the issuer 108, and the consumer 112. The transaction data represents at least a plurality of transactions, e.g., completed transactions, attempted transactions, etc. The transaction data, in this exemplary embodiment, is stored at least by the payment network 106 (e.g., in a data structure associated with the payment network 106, etc.). Additionally, or alternatively, the merchant 102a, the acquirer 104, and/or the issuer 108 may store the transaction data, or part thereof, in a data structure. Further, transaction data may be transmitted between entities of system 100, as used or needed. The transaction data includes, for example, amounts of transactions, merchant IDs, merchant category codes, dates/times of transactions, products purchased and related descriptions or identifiers, product returns/refunds, etc. It should be appreciated that more or less information related to transactions, as part of either authorization and/or clearing and/or settling, may be included in transaction data and stored within the system 100, at the merchant 102a, the acquirer 104, the payment network 106, and/or the issuer 108.

In various exemplary embodiments, consumers (e.g., consumer 112, etc.) involved in the different transactions herein are prompted to agree to legal terms associated with their payment accounts, for example, during enrollment in their accounts, etc. In so doing, the consumers may voluntarily agree, for example, to allow merchants, issuers of the payment accounts, payment networks, etc., to use data collected during enrollment and/or collected in connection with processing the transactions, subsequently for one or more of the different purposes described herein.

Figure 2:
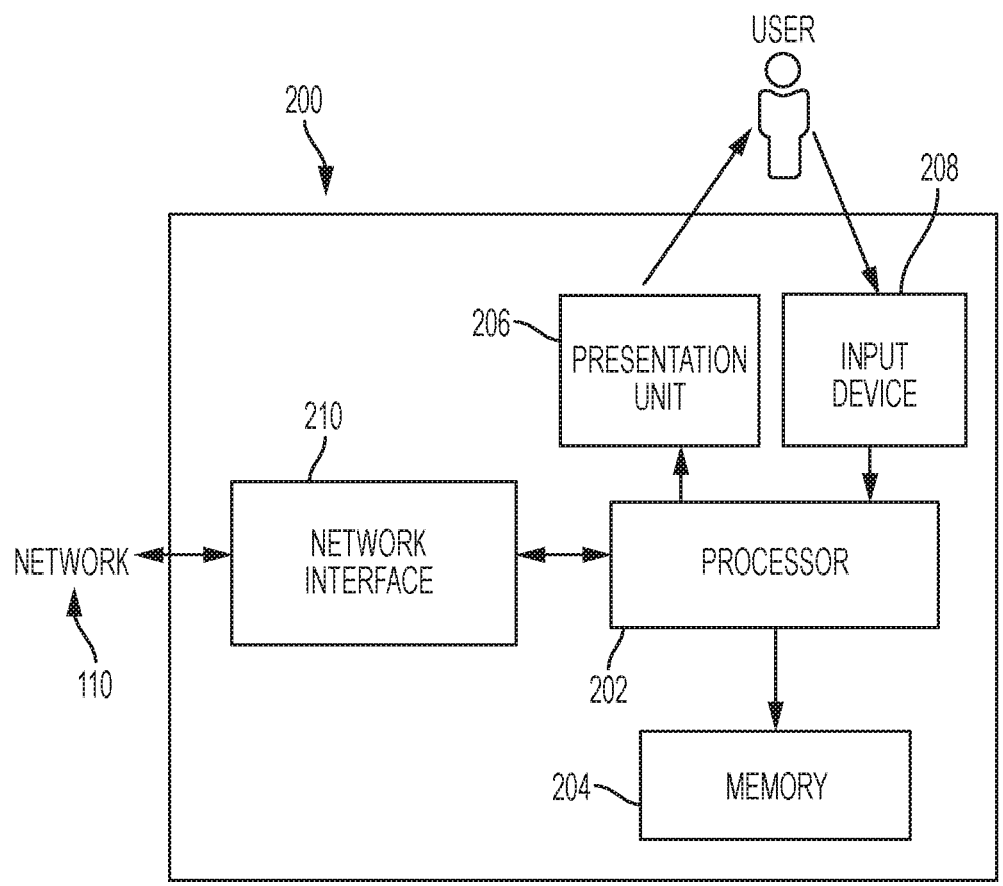
FIG. 2 is a block diagram of a computing device that may be used in the exemplary system of FIG. 1.

FIG. 2 illustrates exemplary computing device 200 suitable for use in the system 100. By way of example (and without limitation), the exemplary computing device 200 may include one or more servers, workstations, personal computers, laptops, tablets, PDAs, telephones (e.g., cellular phones, smartphones, other phones, etc.), other suitable computing devices, combinations thereof, etc. as appropriate. In the system 100 of FIG. 1, the merchants 102a-b, the acquirer 104, the payment network 106, and the issuer 108 are each associated with, or implemented in, computing device 200 coupled to network 110. In addition, the communication device 114 associated with the consumer 112 is also consistent with computing device 200. In addition, the computing device 200 may include a single computing device, or it may include multiple computing devices located in close proximity, or multiple computing devices distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices. Additionally, each computing device 200 illustrated in the system 100 may be coupled to a network (e.g., the Internet, an intranet, a private or public LAN, WAN, mobile network, telecommunication networks, combinations thereof, or other suitable network, etc.) that is either part of the network 110, or separate therefrom.

With reference to FIG. 2, the illustrated computing device 200 generally includes a processor 202, and a memory 204 that is coupled to (and in communication with) the processor 202. The processor 202 may include, without limitation, one or more processing units (e.g., in a multi-core configuration, etc.), including a general purpose central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein. The above examples are exemplary only, and are not intended to limit in any way the definition and/or meaning of processor.

The memory 204, as described herein, is one or more devices that enable information, such as executable instructions and/or other data, to be stored and retrieved. The memory 204 may include one or more computer-readable media, such as, without limitation, dynamic random access memory (DRAM), static random access memory (SRAM), read only memory (ROM), erasable programmable read only memory (EPROM), solid state devices, CD-ROMs, thumb drives, tapes, flash drives, hard disks, and/or any other type of volatile or nonvolatile physical or tangible computer-readable media. The memory 204, and/or data structures included therein, may be configured to store, without limitation, data related to payment accounts, transaction data for transactions processed to the payment accounts, segments of payment accounts by region, rules on payment accounts, location indicators, and/or any other types of data suitable for use as described herein, etc. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer-readable storage media. It should be appreciated that the memory 204 may include a variety of different memories, each implemented in one or more of the functions or processes described herein.

The illustrated computing device 200 also includes a presentation unit 206 that is coupled to (and in communication with) the processor 202. The presentation unit 206 outputs, or presents, to a user (e.g., consumer 112 in the system 100; individuals associated with one or more of the merchants 102a-b, the acquirer 104, the payment network 106, and the issuer 108 in the system 100; etc.) by, for example, displaying, and/or otherwise outputting information and/or data. It should be further appreciated that, in some embodiments, the presentation unit 206 comprises a display device such that various interfaces (e.g., applications, webpages, etc.) may be displayed at computing device 200, and in particular at the display device, to display such information and data, etc. And in some examples, the computing device 200 may cause the interfaces to be displayed at a display device of another computing device, including, for example, a server hosting a website having multiple webpages, etc. With that said, the presentation unit 206 may include, without limitation, a liquid crystal display (LCD), a light-emitting diode (LED) display, an organic LED (OLED) display, an "electronic ink" display, speakers, combinations thereof, etc. In some embodiments, the presentation unit 206 includes multiple units.

The computing device 200 further includes an input device 208 that receives input from the user of the computing device 200. The input device 208 is coupled to (and in communication with) the processor 202 and may include, for example, a keyboard, a pointing device, a mouse, a stylus, a touch sensitive panel (e.g., a touch pad or a touch screen, etc.), another computing device, and/or an audio input device. Further, in some exemplary embodiments, a touch screen, such as that included in a tablet, a smartphone, or similar device, behaves as both a presentation unit and an input device. In at least one exemplary embodiment, a presentation unit and/or an input device are omitted from a computing device.

In addition, the illustrated computing device 200 includes a network interface 210 coupled to (and in communication with) the processor 202 (and, in some embodiments, to the memory 204 as well). The network interface 210 may include, without limitation, a wired network adapter, a wireless network adapter, a mobile telecommunications adapter, or other device capable of communicating to one or more different networks, including the network 110. In multiple embodiments herein, the network interface includes a GPS antenna, suitable to capture GPS signals for processing by the processor 202, to determine the location of the computing device 200 (e.g., in connection with communication device 114, etc.). In one or more embodiments, the computing device 200 relies on additional or other network signals via network interface 210 to determine its location. Any suitable operations to determine locations, by processors, based on GPS signals (or other network signals) may be used. Further, in some exemplary embodiments, the computing device 200 includes the processor 202 and one or more network interfaces incorporated into or with the processor 202.

Referring again to FIG. 1, the system 100, and in particular the issuer 108, includes an engine 116, which is configured, often by executable instructions, to cause a processor (e.g., processor 202, etc.), for example, to perform multiple operations as described herein. The engine 116 generally includes a computing device, which, in this embodiment, is consistent with computing device 200. While the engine 116 is illustrated as incorporated in (or associated with) the issuer 108 (as indicated by the dashed lines in FIG. 1), it should be appreciated that the engine 116 may be incorporated in (or associated with) one or more different parts of system 100, such as the payment network 106, or other parts of alternate systems not shown, or the engine 116 may be a standalone part in other system embodiments.

In some aspects of the system 100, the engine 116 (operating as a location engine) is configured to receive the location indicator for the consumer 112, from the communication device 114, via network 110 (directly, or indirectly). When the received location indicator is indicative of a current location in a particular one (or more) of the regions A-C (different from a last region in which the communication device 114 was present), the engine 116 (in connection with the issuer 108) appends the payment account, associated with the consumer 112 (and the communication device 114), to a segment associated with the particular region in which the communication device 114 is currently present (assuming the payment account is not already appended to the segment). The engine 116 is configured, then, to provide a notification to the issuer 108 associated with the consumer's payment account (e.g., in real time, in near real time, later, etc.). The issuer 108, in response, modifies, as appropriate, one or more rules (e.g., restrictions, etc.) associated with usage of the payment account in the current region(s). For example, the issuer 108 may reduce or increase fraud protection measures based on the current region(s) for the consumer 112 (e.g., the issuer may modify a number of offline transactions permitted for the consumer's payment account and associated payment device, a spending limit for the consumer's payment account, a spending threshold for the consumer's payment account, etc.). The issuer 108 may modify the one or more rules based on the payment account being appended to the particular segment. Or, the issuer 108 may modify the one or more rules only when the particular segment (to which the payment account is appended) satisfies certain criteria (e.g., is a particular segment, etc.), or when a particular location of the consumer 112 satisfies certain criteria (e.g., when the consumer is in a particular region, etc.).

When an additional, or further, location indicator is received from the consumer's communication device 114 indicating, for example, that the consumer 112 (specifically, the consumer's communication device 114) has moved to a different one of the regions A-C or to a different location within one of the regions A-C, the engine 116 further appends the consumer's payment account to a segment associated with the region, or location therein, in which the additional location exits, and so on and so forth for additional location indicators. One or more additional rules associated with usage of the payment may then also be modified, either automatically based on the payment account being appended to the further segment(s) or based on the further segment(s) satisfying certain criteria or the consumer 112 being in a particular location, etc.

Also, the engine 116 may remove the consumer's payment account from a segment to which it has already been appended based on a variety of conditions. For example, a payment account may be limited to two, three or four, etc., segments at one time, thereby removing the first in time one of the currently appended segments when appending a new segment. In another example, the engine 116 may remove segments when no further location indicator, or transaction activity, in the regions associated with the segments is received from the communication device 114 within a predefined period of time of a last location data receipt (e.g., within 3 hours, 8 hours, 12 hours, 24 hours, 3 days, 5 days, 7 days, etc.). Other conditions may relate, for example, to the transaction activity for the payment account in the region associated with the consumer 112, etc. In such cases, the engine 116 may also then notify the issuer 108 that the consumer's payment account has been removed from the particular segment.

Additionally, or alternatively, in other aspects of the system 100, the engine 116 is configured to access transaction data for the consumer 112 and the consumer's payment account, for example, from the payment network 106, etc. The engine 116 is then configured to use various aspects of the transaction data to assign the consumer's payment account to particular segments (e.g., as a criteria for appending the payment account to one or more segments, as a criteria for modifying one or more rules associated with the payment account, etc.). When a number of total transactions for the consumer's payment account and/or when a total spend for the consumer's payment account reaches predefined thresholds, within a specified interval, (e.g., 25 total transactions within the last 30 days, total spend of $4,000.00 within the last 60 days, other thresholds configured by the issuer 108, etc.), the engine 116 appends the payment account to a particular segment associated with the predefined threshold, for example, a frequent transactor segment, a high spender segment, etc. Or, when the consumer 112 performs transactions at one or more particular merchants (e.g., at merchant 102a, etc.) or one or more particular category of merchants (e.g., transportation-based merchants, etc.), the engine 116 may append the consumer's payment account to a particular segment associated with one or more merchants, for example, a merchant 102a segment, etc. The engine 116 is configured, then, to provide a notification to the issuer 108 (e.g., in real time, in near real time, later, etc.). The issuer 108, in response, modifies, as appropriate, one or more rules (e.g., restrictions, marketing efforts, etc.) associated with usage of the payment account. For example, the issuer 108 may reduce or increase fraud protection measures based on the resulting segment (e.g., relating to number of offline transactions permitted for payment devices, spending limits, spending thresholds, etc.). Also for example, the issuer 108 may make special offers to the consumer 112 based on the resulting segment. The issuer 108 may modify the one or more rules based on the payment account being appended to the particular segment. Or, the issuer 108 may modify the one or more rules only when the particular segment (to which the payment account is appended) satisfies certain criteria (e.g., is a particular segment, etc.) or when the transaction data satisfies certain criteria (e.g., when a number of total transactions for the consumer's payment account and/or when a total spend for the consumer's payment account reaches predefined thresholds, etc.), or when a particular location of the consumer 112 satisfies certain criteria (e.g., when the consumer is in a particular region, etc.).

Moreover, and as previously described, the engine 116 may remove the consumer's payment account from segments to which it has already been appended, for example, if the consumer 112, and particularly the consumer's payment account, fails to satisfy the various predefined thresholds associated with the segments, such as minimum transactions and minimum spend, in a next specified interval, or during a continuous interval (e.g., last 30 days, etc.). The engine 116 may again also notify the issuer 108 that the consumer's payment account has been removed from the particular segment. When the consumer 112 is removed from one of the segments, the issuer 108 may then make alternative offers to the consumer 112 to attempt to regain higher usage of the payment account.

Figure 3:
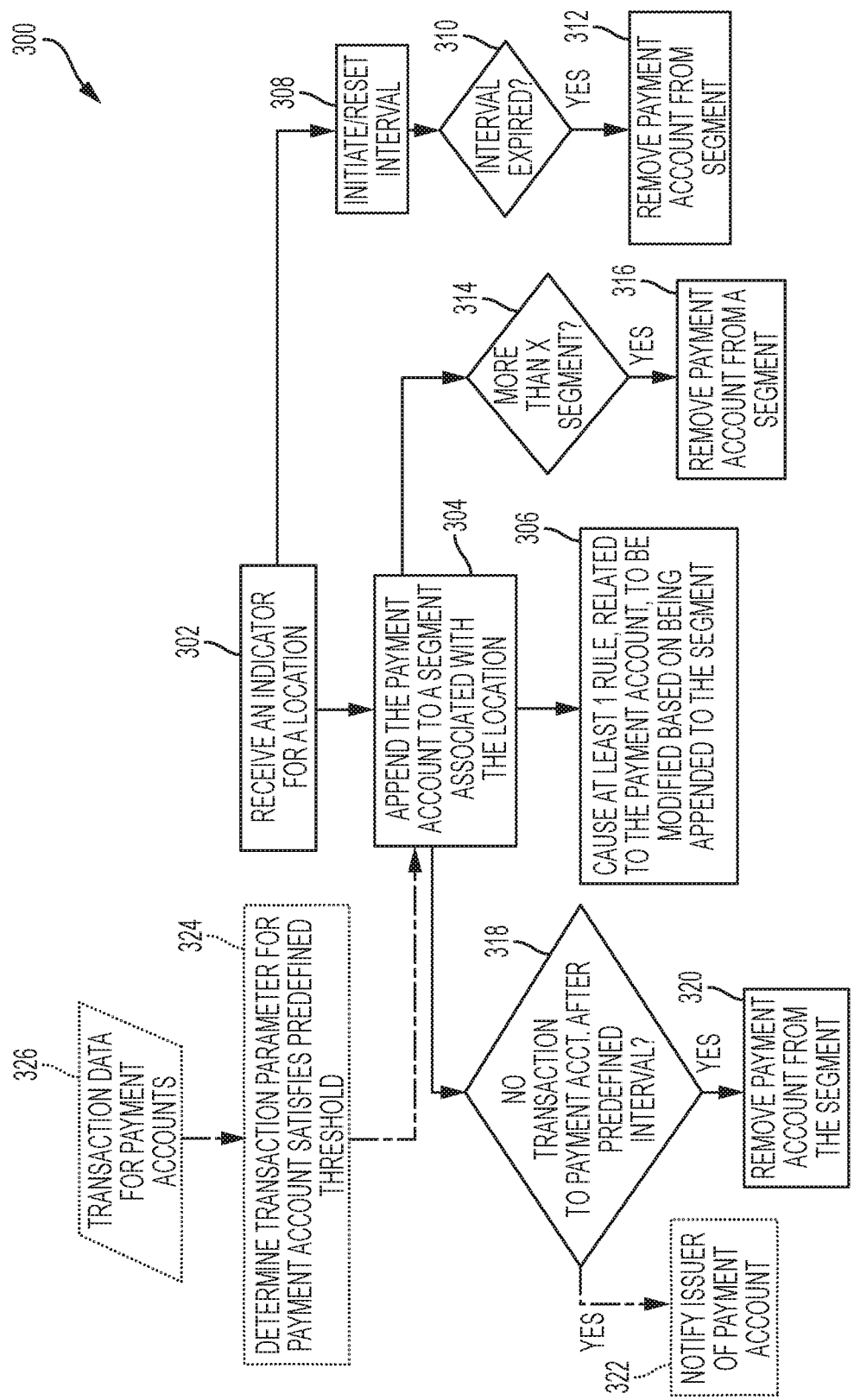
FIG. 3 is an exemplary method for identifying a payment account to a segment, which may be implemented in the system of FIG. 1.

FIG. 3 illustrates exemplary method 300 for use in identifying payment accounts to segments. The exemplary method 300 is described as implemented in the engine 116 of the system 100 with it understood that the engine 116 is suitable for performing one or more of the various operations described with reference to the method 300. However, the method 300 could be implemented in (or in connection with) one or more other entities, in other embodiments. Further, reference is also made to other parts of the system 100 and the computing device 200. The methods herein, however, should not be understood to be limited to the exemplary system 100, or the exemplary computing device 200. Likewise, the systems and the computing devices herein should not be understood to be limited to the exemplary method 300.

At 302 in the method 300, the engine 116 receives a location indicator relating to the consumer 112. The indicator is received by the engine 116 from the consumer's communication device 114, which may be in real time or near real time in various embodiments (often after occurrence of an event), or at one or more regular of irregular intervals in other embodiments. The location indicator generally is transmitted, by the communication device 114, when the consumer 112 moves from one of the regions A-C in the system 100 to another one of the regions A-C, or when the consumer 112 moves within one of the regions A-C. For example, at time (a) in the system 100, the engine 116 may receive a first location indicator identifying the consumer 112 in region A. At time (b), the engine 118 may receive a second location indicator identifying the consumer 112 in region B. At time (c), the engine 118 may receive a third location indicator identifying the consumer 112 in region C. At time (d), the engine 118 may receive a fourth location indicator identifying the consumer 112 at a new location in region C. As indicated above, the location indicator may be transmitted, by the communication device 114, at one or more regular or irregular intervals (e.g., every hour, every 5 hours, every 24 hours, etc.), or in response to an event such as, for example, movement of the communication device 114 greater than a predefined distance (e.g., 1,000 meters (potentially depending on the region), etc.), power cycle of the communication device 114, changing modes (e.g., into or out of airplane mode, etc.) of communication device 114, etc. However, it should again be appreciated that the present disclosure is not limited to use of location indicators to assign payment accounts to segments, as other criteria may be used (as described herein).

Upon receiving the location indicator, the engine 116 then appends the consumer's payment account to a segment associated with the location indicator, at 304. In various embodiments, the segments, or region segments, are segregated by state, postal code, country, etc. The payment network 106 may include a segment for each country, or group of countries, in Europe, for example. Or, the segregation of regions into different segments may be restriction or rule based, rather than geography based. For example, Mexico and France may be associated with the same region, because certain rules related to the use of payment accounts may be similar in these countries, thereby ignoring the disparate locations of the countries. In at least one embodiment, though, each segment is specific at least to a country, such that no two different countries are associated with a single segment.

In some embodiments, use of regions as a basis for payment account segmentation may facilitate powering particular EMV scripts for offline controls that can be used to help inhibit fraud. For example, when the consumer 112 is traveling through several different regions in a short period, and the consumer's payment account is appended to a segment comprising a broad compilation of the several different regions through which the consumer 112 is traveling (e.g., based on receipt of multiple different location indicators over a short period of time, etc.), the segment may include one or more rules that dictate generally relaxed fraud controls for the consumer 112 during the travel (e.g., so that the fraud controls take into account the travel to the various different regions, etc.). The rules associated with the segment may then be activated immediately, upon the payment account being appended to the particular segment, or later when certain criteria are satisfied (e.g., relating to the consumer's payment account, relating to the consumer (e.g., the consumer's location, etc.), etc.).

In other embodiments, the segments may be segregated based on data other than location data, for example, transaction type, merchant type, or particular merchant involved in a transactions, instead of consumer location. For example, when the consumer 112 performs a transaction at a travel-based merchant in an amount high enough to look like a travel fare, the engine 116 may receive an indicator of such transaction (e.g., at 302 in method 300, etc.) and append (e.g., at 304 in method 300, etc.) the consumer's payment account to a travel segment that accounts for travel through various different regions in a generally short period of time (e.g., so that the fraud controls take into account the travel to the various different regions, etc.). Or, when the consumer 112 performs a transaction at Home Improvement Store, the engine 116 may append the consumer's payment account to a segment that provides marketing offers for various home products. Then, certain rules associated with the payment account relating to marketing may be implemented and/or modified, while other rules remain unchanged (and/or not invoked because of the particular segment to which the payment account is appended).

In connection with appending the consumer's payment account to a segment associated with the location indicator, the controls or rules associated with the segment may either take effect immediately or they may be delayed (e.g., until certain criteria are satisfied, depending on subsequent approval, etc.). In some aspects, the engine 116 may automatically append the consumer's payment account to the segment such that the controls or rules associated with the segment take effect immediately. However, in other aspects, the engine 116 may transmit a confirmation to one more different entities before the controls or rules associated with the segment take effect. As an example, the engine 116 may transmit a confirmation to the consumer 112 indicating that the consumer's payment account has been appended to the segment and requesting the consumer 112 to either accept or reject the segment (e.g., via an email message, SMS message, etc., such as, without limitation, "We see you have made a purchase that indicates possible EU travel. Would you like to be assigned to a Broader EU Travel Segment?"). As another example, the engine 116 may transmit a notification to the issuer 108 requesting approval to append the consumer's payment account to the segment (e.g., a VIP segment based on purchase and/or travel history, etc.) and/or additional restrictions for the segment (e.g., date of expiration, etc.).

Once the payment account is appended to the desired segment, the engine 116 causes at least one rule, related to the payment account, to be modified, at 306. Again, this action may take place immediately, or it may be delayed when one or more confirmations and/or responses are required, or until one or more certain criteria relating to the payment account, the consumer 112, the segment, etc. are satisfied (e.g., total spend, total transactions, location requirements, etc.). In any case, because different regions are often associated with different security, infrastructure, accessibility of computing devices, networks, etc., processing purchase transactions to payment accounts in different regions may be done differently. As such, one or more different rules may be implicated to reduce and/or inhibit fraudulent transactions to a payment account, in different regions, while still enabling consumer 112 to fund purchases using his/her payment account. The rules may be associated with the new segment to which the consumer's payment account is appended, or to one or more other segments to which the consumer's payment account was previously appended.

For example, in system 100, region A may have less stable network infrastructure, or may be a region in which purchase transactions using payment devices are less common or in which point of sale (POS) terminals that perform online EMV transaction may be more sparse. A rule that permits a certain number of offline EMV transactions between online EMV transactions may thus be different in region A than in region B, for example, with prevalent online POS terminals. As such, when the consumer 112 is in region A, at time (a), and the consumer's payment account is appended to a segment associated with region A (or to a segment that has a certain rule relating to region A that is only modified when the consumer 112 is identified as being in region A), a script may be initiated, by the engine 116 (directly or indirectly), by which the payment device associated with the consumer's payment account is configured to permit 10 off-line EMV transactions in a row, rather than just 3 off-line EMV transactions.

In another example, in system 100, the consumer's home address may be in region A. When the consumer travels out of region A, to region C at time (c), the issuer 108 may initially decline any transactions made by the consumer 112 at the merchant 102b based on a rule (potentially associated with the consumer's payment account being appended to a segment associated with region A) restricting such transactions when the consumer 112 is in a different region, regardless of the proximity of the different region to region A. Consistent with the description herein, though, upon the consumer's payment account being appended with a segment associated with region C, the issuer 108 then permits transactions to the consumer's payment account in region C, for example, at merchant 102b. For example, the rule restricting such transactions, which is associated with the consumer's payment account being appended to a segment associated with region A, may be modified based on further appending the consumer's payment account to the segment associated with region C (or simply based on a criteria that the consumer 112 be present in region C, as part of the consumer's payment account being appended to another segment). In addition, a new rule may be activated providing offers to the consumer 112 for merchants in region C, such as merchant 102b.

It should be appreciated that various different rules may be implicated by the verification of the consumer 112 in a region, other than the consumer's home region, and/or assignment of the consumer 112 to a particular segment. Some of the rules may be directed to fraud prevention, while others may be related to business generation such as rewards, marketing efforts, product offers, etc. For example, upon landing at an airport in a particular country, the consumer 112 may be assignment to a travel segment having a rule associated therewith that causes an offer to be transmitted to the consumer 112 for a particular ground transport service at the airport. Then, upon returning to an airport in a home region for the consumer 112, the corresponding home segment of the consumer 112 may unwind any previously assigned fraud impacting travel segments and cause a pizza offer to be transmitted to the consumer 112 (since the consumer may be too tired from travel to cook). Still other rules may be directed to reminders for the consumer 112 to load funds to a payment account or to use a particular payment account in certain instances. For example, for a multi-currency prepaid travel card product, the engine 116 might send a reminder to the consumer 112 to load or use that card while traveling in one of the supported currency countries if the card is not used within four hours of arrival in one of the countries (e.g., upon assignment of the consumer 112 to a particular travel segment involving one of the countries, etc.). What's more, it should be appreciated that the various rules may be implicated and/or modified based on the consumer's payment account being appended to a particular segment, or based on the consumer's payment account (and/or the consumer) satisfying one or more predefined criteria (e.g., spend criterial, location criteria, etc.).

With continued reference to FIG. 3, the engine 116 also provides various operations relating to rule modifications for lingering payment accounts appended to various segments, for example, after the consumer 112 has returned to his/her home region after traveling to different regions, or after the consumer moves to a new home region. For example, the engine 116 may assign the consumer's payment account to a Relocation segment when the consumer 112 updates his/her address with the issuer 108. In this segment, rules may then relate to marketing efforts (e.g., home improvement offers, etc.), to modified location-based fraud controls for a time period (to accommodate for the relocation), etc.

At 308 in the method 300, the engine 116 initiates an interval, after receiving the location indicator from the communication device 114 (or other indicator) relating to a particular segment, or at other times independent of receiving the location indicator. The interval may include any suitable interval such as, for example, 8 hours, 24 hours, 1 week, etc., and the interval may be reinitiated or restarted upon receipt of further location indicators from the communication device 114, from within the region, or at scheduled times. The engine 116 then determines, at 310, if the interval for the particular segment is expired and, when the interval is expired, removes the payment account from the segment at 312. Otherwise, the interval is reset.

As an example, in system 100, at time (c), the consumer's communication device 114 transmits a location indicator for a location within region C to the engine 116. In turn, the engine 116 appends the consumer's payment account to a segment associated with region C. At about the same time, an interval is initiated by engine 116 that is 10 hours in duration. In this example, six hours later, at time (d), the communication device 114 transmits another location indicator to the engine 116 indicative of a new location within region C. Upon receipt of the subsequent location indicator, at time (d), the engine 116 resets the 10-hour interval. As the consumer 112 further travels/moves within region C, the interval is continually reset in this manner, thereby preserving any rules associated with the consumer's payment account being appended to the segment associated with region C, and inhibiting modification of such rules. When the consumer 112 leaves region C, and enters region B, for example, no further location indicators indicating region C will be transmitted by the communication device 114. In turn, the engine 116 determines that the interval is expired after the 10-hour duration, and then removes the payment account from the segment.

Further in the method 300, the engine 116 limits the number of segments in which the consumer's payment account may be appended based on location. However, such limitations are not required in all embodiments, and/or different limitations may be used (e.g., limitations based on total segments (and not just location-based segments), limitations based on segments assigned by criteria other than location, etc.).

For example, at 314, after appending the payment account to a segment, the engine 116 determines if the number of total segments to which the payment account is appended exceeds a predefined threshold number "X." The threshold number "X" may include any suitable number such as, for example, 3, 7, 15, etc. In various embodiments, the threshold is based on a propensity of the consumer 112 to travel between different regions. For example, when the U.S. is encompassed in one region and a consumer resides in Missouri, a need for the consumer's payment account to be appended to multiple regions may be limited, as compared to a consumer living in Europe in which each country defines one or multiple regions, where the consumer may travel between three or five regions in one day. As should be appreciated, the threshold may be selected based on a variety of factors related to, for example, the consumer 112, the consumer's propensity to travel (business or personal), proximity of the consumer's home region to other regions, etc.

When the total segments to which the consumer's payment account is appended exceeds the predefined threshold, the engine 116 then removes the payment account from one of the segments at 316. In general, the engine 116 will remove the payment account from the first entered segment, or oldest segment. One exception to this removal, in one or more embodiments, may be to preserve the payment account in a segment associated with the consumer's home address (i.e., a default segment), whereby the second oldest segment would then be removed, at 316.

In another aspect of the method 300, the engine 116 determines, at 318, if any transactions have occurred in the region, associated with the segment to which the consumer's payment account is appended at 304, since receiving the indicator and/or since appending the payment account to the segment. When no transactions are attempted by the consumer 112 in the region using the payment account, within a predefined interval (which is similar to the intervals described above), the engine 116 removes the payment account from the segment associated with region, at 320. Otherwise, the engine 116 repeats the determination at 318 for subsequent intervals.

Optionally in the method 300 (as indicated by the dashed lines in FIG. 3), when no transactions are attempted by the consumer 112 in the payment account, the engine 116 may also notify the issuer 108 of the payment account of the lack of transactions, at 322. In turn, the issuer 108 may present one or more offers to the consumer 112 to attempt to encourage the consumer 112 to perform further transactions, or the issuer 108 may contact the consumer 112 to determine if the consumer 112 is having issues with use of the payment account or, specifically, the payment device in the region. In at least one embodiment, the engine 116 notifies the issuer 108 after a first predefined interval (e.g., after five hours, etc.), and then removes the payment account from the segment associated with the region after a second predefined interval (e.g., after 24 hours, after 48 hours, etc.). It should be appreciated that various rules, based on the absences of use of the consumer's payment account, may be used to secure the payment account when not used in a region, in which it is located.

As an example, in the system 100, the consumer 112 may travel from home region A to region C. The communication device 114 then transmits a location indicator to the engine 116, which, in turn, appends the payment account for the consumer 112 to the segment associated with region C. If no transactions are attempted by the consumer 112 in region C (at merchant 102b, for example) using the payment account, within a predefined interval, the engine 116 removes the consumer's payment account from the segment associated with region C.

As further shown in FIG. 3, the engine 116 optionally (as indicated by the dashed lines) may determine, at 324, if a transaction parameter related to the consumer's payment account satisfies a predefined threshold. The transaction parameter may include any desired parameter such as, for example, total spend using the payment account, total transactions made using the payment account, etc. It should be appreciated that a variety of different transaction parameters may be provided to the engine 116, in order to append payment accounts into a variety of different segments. The engine 116 determines whether or not the transaction parameter is satisfied by accessing transactions data at 326 for the consumer's payment account, stored in memory 204, for example.

In response to satisfying the threshold, the engine 116 appends, at 304, the payment account to an appropriate segment, for example, indicative of the transaction parameter which is satisfied. As described above, the presence of the payment account in the segment may then cause at least one rule for the payment account to be modified. Depending on the segment, the rule may relate to limits on the number of transactions, the limits applied to individual transactions, limits to total spend using the payment account, etc. Further one or more rules may be modified to cause different marketing materials to be directed to the consumer 112, etc. As also described above, in some embodiments, the presence of the payment account in the segment does not immediately cause the at least one rule for the payment account to be modified. Instead, the at least one rule is only modified when one or more predefined criteria relating to the payment account, the consumer, the segment, etc. are satisfied.

Conversely, the engine 116 also removes the payment account from the respective segment when the payment account fails to satisfy the predefined threshold in subsequent intervals (i.e., when the consumer does not maintain a spend total above the threshold, or does not maintain a total number of transactions above the threshold). The removal of the payment account from the segment, by the engine 116, may be subject to certain conditions including, for example, a 30-day waiting period to remove the payment account, etc. In various embodiments, because rule modifications related to segments associated with transaction parameters are less indicative of fraud than those based on location indicators, a payment account may be permitted to linger in a segment, when appended based on operation 324, as compared to payment account appended based on operation 302.

In one example, the consumer 112 accumulates spending to the payment account during a defined interval (e.g., 15 days, 30 days, 60 days, a last 30 days, etc.). The engine 116 may then determine if the consumer's total spend during the defined interval, for the payment account, exceeds a predefine threshold such as, for example, $2,000, $4,000, $10,000, or some other predefined threshold. In response to satisfying the threshold, the engine 116 may then append the consumer's payment account to a "high spender" segment. In another example, the engine 116 may determine if a total number of transactions made using the payment account, within a defined interval (e.g., 15 days, 30 days, 60 days, a last 30 days, etc.), exceeds a predefined threshold such as, for example, 25 transactions, 50 transactions, 100 transactions, etc. In response to satisfying the threshold, the engine 116 may append the consumer's payment account to a "frequent transactor" segment.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a first indicator for a first location from a communication device, the communication device associated with a consumer, and the consumer associated with a payment account issued to the consumer by an issuer; (b) appending, by a computing device, the payment account to a first segment based on the first location indicator; and (c) causing at least one rule associated with the payment account to be modified, the at least one rule relating to authorization of transactions in a first region including the first location.

With that said, exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "connected to," "in communication with," or "coupled to" another element, it may be directly on, connected or coupled to, or in communication with the other element, or intervening elements may be present. In contrast, when an element is referred to as being "directly on," "directly connected to," "directly in communication with," or "directly coupled to" another element, there may be no intervening elements present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature could be termed a second feature without departing from the teachings of the exemplary embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
an issuer including a computing device, which includes a non-transitory memory and a processor coupled to the non-transitory memory; and
wherein the non-transitory memory includes multiple rules, identification of a portable communication device for a user, and executable instructions, each of the multiple rules specific to usage of an account in one of multiple segments, the portable communication device registered to the account by the issuer; and
wherein the executable instructions, when executed by the processor, cause the processor to:
receive, from the portable communication device, via a wireless network, a first indicator indicative of a first location of the portable communication device, the first location being a location of the portable communication device at a first time in a first region;
in response to the first indicator, determine that the first location is physically within the first region;
based on determining that the first location is physically within the first region, and based on the account not already appended to a first segment of the multiple segments, append the account of the user to the first segment of the multiple segments, wherein the first segment is specific to the first region, which includes one or more first countries;
automatically activate a first rule of the multiple rules specific to the first segment and included in the non-transitory memory, for the account immediately based on the account being appended to the first segment, the first rule indicative of a first restriction on the account, which includes a first number of offline transaction(s) to the account permitted between online transactions based on network accessibility in the first region;
in response to activating the first rule, modify, based on a first script, a number of permitted offline transactions in a payment device for the account to be consistent with the first number of offline transactions; and
receive, from the portable communication device, via the wireless network, a second indicator after receiving the first indicator, the second indicator indicative of a second location of the portable communication device, the second location being a location of the portable communication device at a second time in a second region;
in response to the second indicator, determine that the second location is physically within the second region;
based on determining that the second location is physically within the second region, and based on the account not already appended to a second segment of the multiple segments, append the account to the second segment of the multiple segments, which is different than the first segment and specific to the second region, which includes one or more second countries;
automatically activate a second rule of the multiple rules specific to the second segment and included in the non-transitory memory, for the account immediately based on the account being appended to the second segment, the second rule indicative of a second restriction on the account, which includes a second number of offline transaction(s) to the account being permitted between online transactions based on network accessibility in the second region, the second number different than the first number;
in response to activating the second rule, modify, based on a second script, the number of permitted offline transactions in the payment device for the account to be consistent with the second number of offline transactions;
determine whether a number of total segments to which the account is appended exceeds a predefined threshold; and
based on a determination that the number of total segments to which the account is appended exceeds the predefined threshold:
remove the account from the first segment; and
automatically deactivate the first rule specific to the first segment.

2. The system of claim 1, wherein the executable instructions, when executed by the processor, further cause the processor to:
receive, from the portable communication device, via the wireless network, a third indicator after receiving the second indicator, the third indicator indicative of a third location of the portable communication device, the third location being a location of the portable communication device at a third time in a third region;
in response to the third indicator, determine that the third location is physically within the third region;
based on determining that the third location is physically within the second region, and based on the account not already appended to a third segment of the multiple segments, append the account to the third segment of the multiple segments; and
automatically activate a third rule of the multiple rules specific to the third segment and included in the non-transitory memory, for the account immediately based on the account being appended to the third segment.

3. The system of claim 1, wherein the executable instructions, when executed by the processor, further cause the processor to remove the account of the user from the second segment, after a predefined interval of receiving the second indicator in which no further indicator for a location within the second region is received from the portable communication device.

4. The system of claim 1, wherein the account of the user is associated with a default segment; and
wherein the executable instructions, when executed by the processor, cause the processor, after a predefined interval in which no indicator for a location within the second region is received from the portable communication device, to:
remove the account from the second segment;
automatically deactivate the second rule specific to the second segment immediately based on the account being removed from the second segment;
append the account to the default segment; and
automatically activate at least one of the multiple rules specific to the default segment.

5. The system of claim 4, wherein the executable instructions, when executed by the processor, further cause the processor to notify the issuer when no transaction is directed to the account of the user within the predefined interval.

6. The system of claim 1, wherein the executable instructions, when executed by the processor, further cause the processor to transmit a notification to the issuer, when the account of the user is appended to the first segment.

7. The system of claim 1, wherein the portable communication device includes a smartphone.

\* \* \* \* \*